United States Patent [19]

Dyer

[11] Patent Number: 5,365,878
[45] Date of Patent: Nov. 22, 1994

[54] POULTRY NEST PAD

[75] Inventor: Bill W. Dyer, Cullman, Ala.

[73] Assignee: Dyer Poultry Supply, Inc., Cullman, Ala.

[21] Appl. No.: 137,350

[22] Filed: Oct. 18, 1993

[51] Int. Cl.$^5$ .............................................. A01K 31/14
[52] U.S. Cl. ................................................. 119/50.5
[58] Field of Search ................ 119/19, 21, 45.1, 50.5, 119/28

[56] References Cited

U.S. PATENT DOCUMENTS

| | | | |
|---|---|---|---|
| 3,242,904 | 3/1966 | Rannou | 119/48 |
| 3,641,983 | 2/1972 | Keen et al. | 119/19 X |
| 4,023,530 | 5/1977 | Cobb | 119/48 X |
| 4,046,107 | 9/1977 | Kuster | 119/48 X |
| 4,367,694 | 1/1983 | Goyheneix | 119/48 X |
| 4,796,563 | 1/1989 | Keuter | 119/28 |
| 5,257,597 | 11/1993 | Feuerhelm | 119/28 |

Primary Examiner—Gene Mancene
Assistant Examiner—Thomas Price
Attorney, Agent, or Firm—Veal & Associates

[57] ABSTRACT

The present invention relates to a nesting pad for poultry confinement structures in egg laying operations. The nesting pad is wire mesh with a plurality of longitudinal wires connected by a plurality of horizontal wires. The longitudinal wires have molded thereupon a pliable material such as a rubber composition. The pliable material forms ridges upon an upper surface of the longitudinal wire members. The horizontal cross members are molded with a sheath of said pliable material. The molded pad is acceptable to egg laying hens. The nesting pads are easy to clean and provide a poor habitat for poultry pests. Pliable ridges support freshly laid eggs and the pads can be shaped to fit existing confinement structures.

5 Claims, 3 Drawing Sheets

POULTRY NEST PAD

FIELD OF THE INVENTION

The present invention relates to nesting pads used in poultry confinement buildings by poultry breeders and egg producers. More particularly, this invention relates to a wire mesh nesting pad for egg laying hens. In even greater particularity, the invention relates to a wire mesh nesting pad coated with a pliable material and shaped to fit within conventional hen houses.

BACKGROUND OF THE INVENTION

Poultry breeders and egg producers have utilized nesting pads to promote egg laying by hens in their poultry confinement structures. Straw was commonly used in the past as a nesting material. Over the years, the poultry industry has grown to utilize larger and more sophisticated structures for poultry confinement. Breeders and producers found that straw was detrimental to keeping these confinement structures clean. New nesting materials were tested or developed for use within the larger confinement structures. The new nesting materials include rubber mats, non-woven mats, carpet pads, plastic pads and Astro Turf® pads such as the pad disclosed shown in U.S. Pat. No. 3,507,010.

The alternative nesting materials are useful in many respects but also present some disadvantages. Many of the materials are difficult to clean and as such must be replaced on a regular basis. Retained waste is a breeding ground for bacteria and diseases that pose a health risk to the poultry. The woven or turf-like products provide a habitat for parasites and other insects which are associated with confined poultry and which also endanger the health of the birds.

There is a need in the poultry industry for a nesting pad which is acceptable to egg laying hens, supports delicate eggs and is easy to clean. The pads must also be adapted for use within existing poultry confining structures.

SUMMARY OF THE INVENTION

It is the principal object of the present invention to provide an improved nesting pad which is adapted for use in existing poultry confinement structures.

Another object of this invention is to provide a nesting pad which is acceptable to egg laying hens such that egg production is maximized.

A further object of this invention is to provide a nesting pad which is easily cleaned without sophisticated equipment or replacement of the pad.

Still another object of this invention is to provide a nesting pad which prevents the collection of parasites and insects harmful to poultry.

These and other advantages of the present invention are provided by a wire mesh pad which is covered with a pliable material. The wire mesh pad comprises parallel longitudinal wires connected by parallel horizontal cross wires. The upper surface of the wires and even cross wires (if desired) are coated with rubber. The rubber coating forms parallel ridges which provide a cushion for freshly laid eggs.

The mesh pads are shaped to fit within existing nesting boxes. Edges of the pads are bent to form a concave upper surface and a front edge of the pad is bent downward. The bent pad rests within a nesting box with a rear edge elevated such that the pad angles downward toward the front lip. Freshly laid eggs will move down the pad through an opening covered by a semi-rigid flap into a collection area such as a trough or channel.

BRIEF DESCRIPTION OF THE DRAWINGS

Apparatus embodying features of my invention are depicted in the accompanying drawings which form a portion of this disclosure and wherein.

DESCRIPTION OF THE PREFERRED EMBODIMENTS

Figure 1:
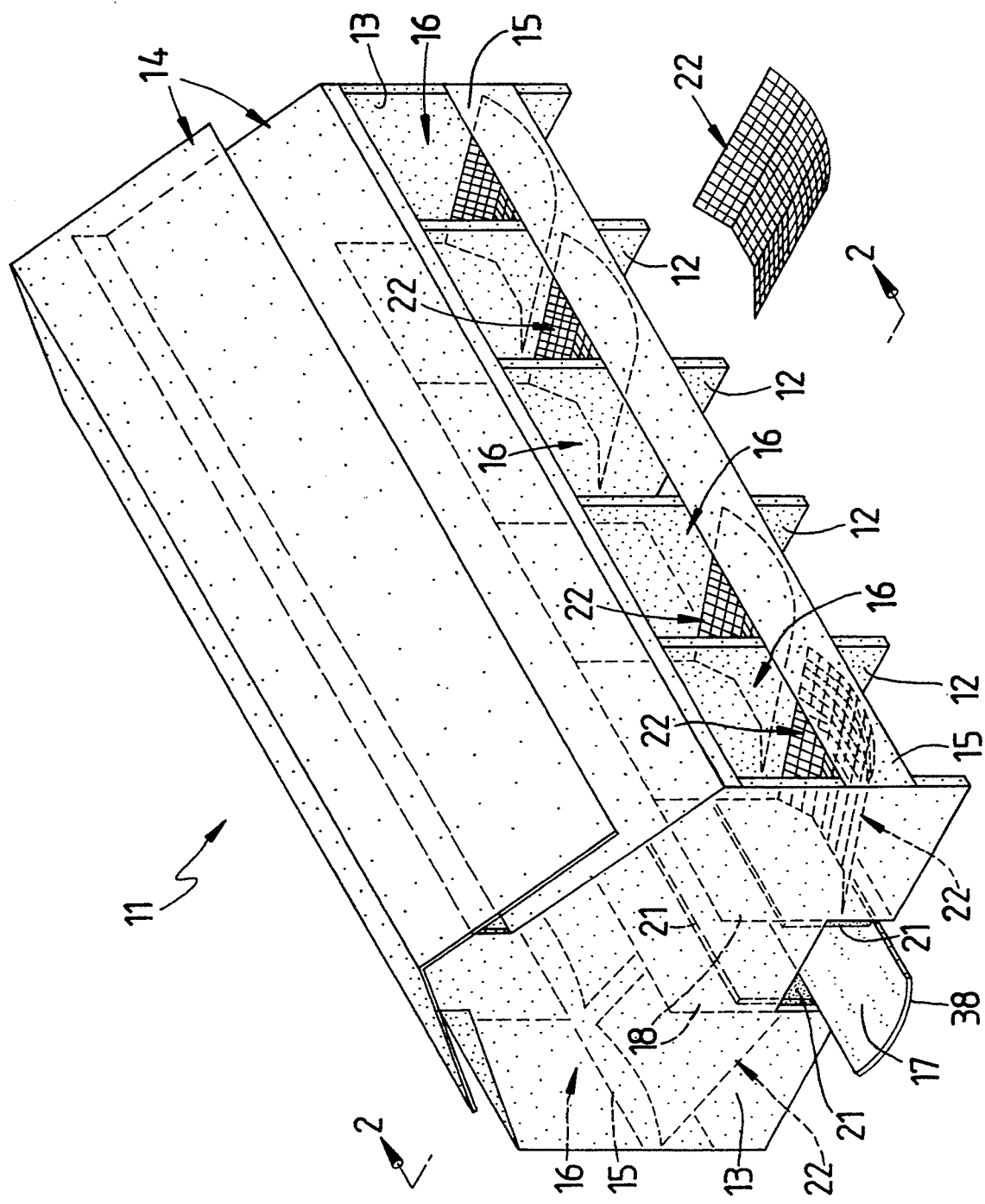
FIG. 1 is a perspective view of a hen confining structure utilizing the present invention.
Figure 2:
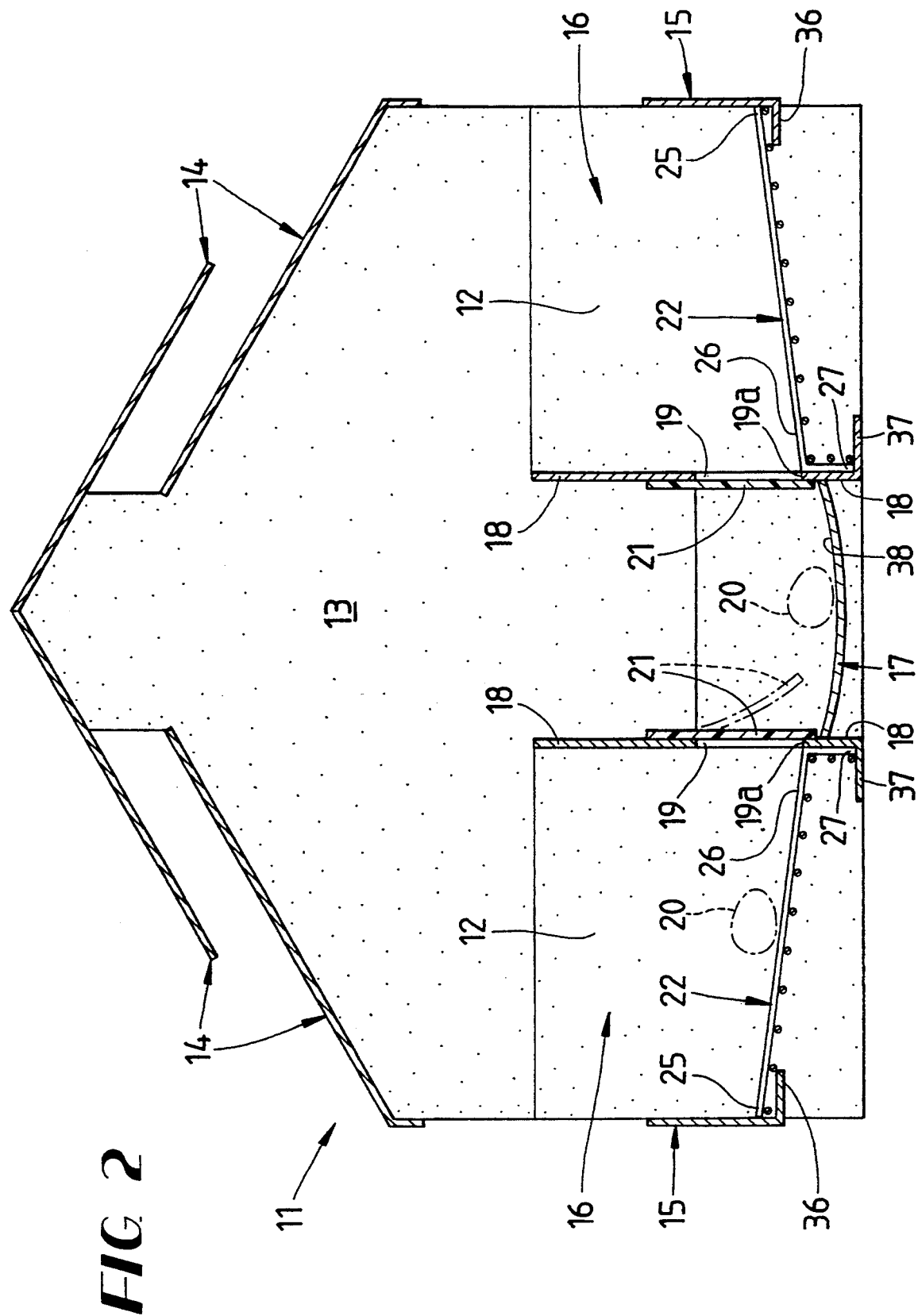
FIG. 2 is a sectional view of a hen confining structure of FIG. 1 taken along lines 2—2 of FIG. 1.

Referring to the drawings for a clearer understanding of the invention, FIG. 1 shows a poultry confinement structure indicated generally by reference numeral 11. On the structure 11 comprises a plurality of partitions 12 and end walls 13 with a roof 14. The partitions 12 define a plurality of bays 16 which house the laying hens (not shown). A pair of sidewalls 15 extend longitudinally connecting on end wall portions 13 and defining an access port for the bays. The structure 11 has a chute 17 defined by interior walls 18 between the plurality of bays 16. Referring now to FIG. 2, it can be seen that plurality openings 19 connect each bay 16 with the chute 17. Semi-rigid flaps 21 depend from interior walls 18 and cover the openings 19 as shown in FIG. 2. The semi-rigid flaps 21 may be rubber, plastic, or any flexible material which would allow an egg 20 to pass from the bay 16 to the chute 17.

Figure 4:
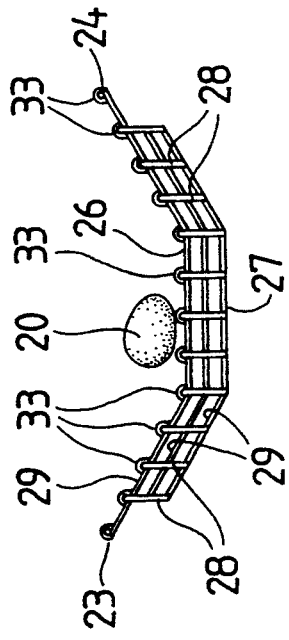
FIG. 4 is an end view of the pad in FIG. 3 shown supporting an egg.
Figure 3:
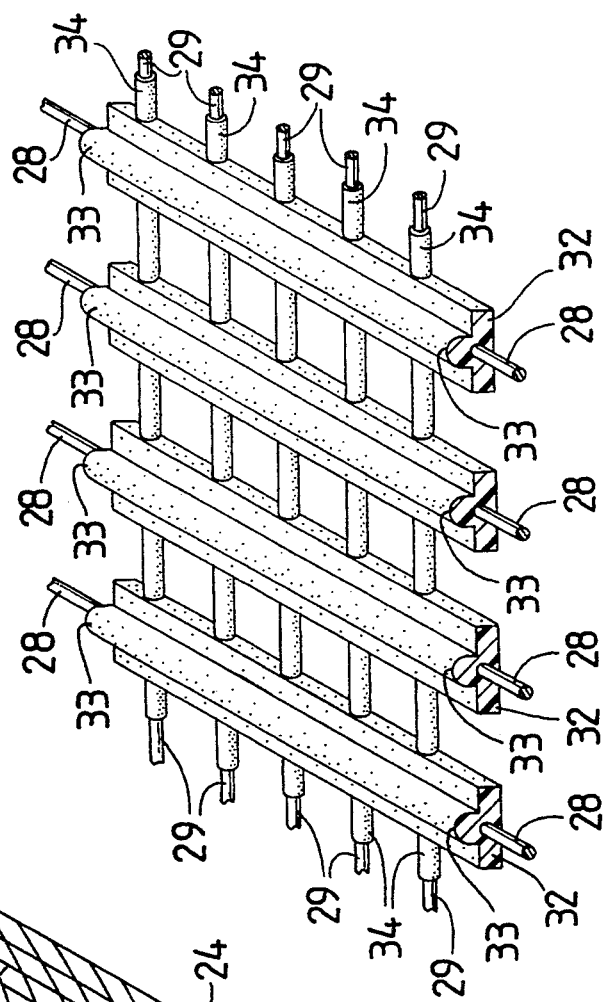
FIG. 3 is a perspective view of a shaped wire mesh pad.

Referring back to FIG. 1, a nesting pad 22 is shown forming a floor in each bay 16. The nesting pad 22 is formed from wire mesh and is bent upward at longitudinal edges 23 and 24 to create a concave surface 26. A first edge 30 of nesting pad 22 is bent downward relative to surface 26 to form a lip 27 as seen in FIGS. 2 and 3. As will be noted, lip 27 rests on an outwardly extending flange 37 formed at the bottom of interior wall 18 such that concave surface 26 is maintained at an elevation commensurate with opening 19. A detailed view of the wire mesh nesting pad 22 in FIG. 4 shows a plurality of spaced-apart, longitudinal wires 28 connected by horizontal cross wires 29. Wires 28 and 29 intersect at crossover points 31 and are secured by welds (not shown but known in the art). The longitudinal wires 28 have a pliable material 32 molded thereon. In the preferred embodiment, the pliable material 32 is a rubber composition and forms longitudinal ridges 33 on the surface 26 above each wire 28. The cross wires 29 are coated with pliable material 32 to form a sheath 34 which covers the wire to present a uniform appearance but do not form cross ridges. Ridges 33 of the nesting pad 22 support the eggs 20 laid by hens on the nesting pads 22.

Figure 5:
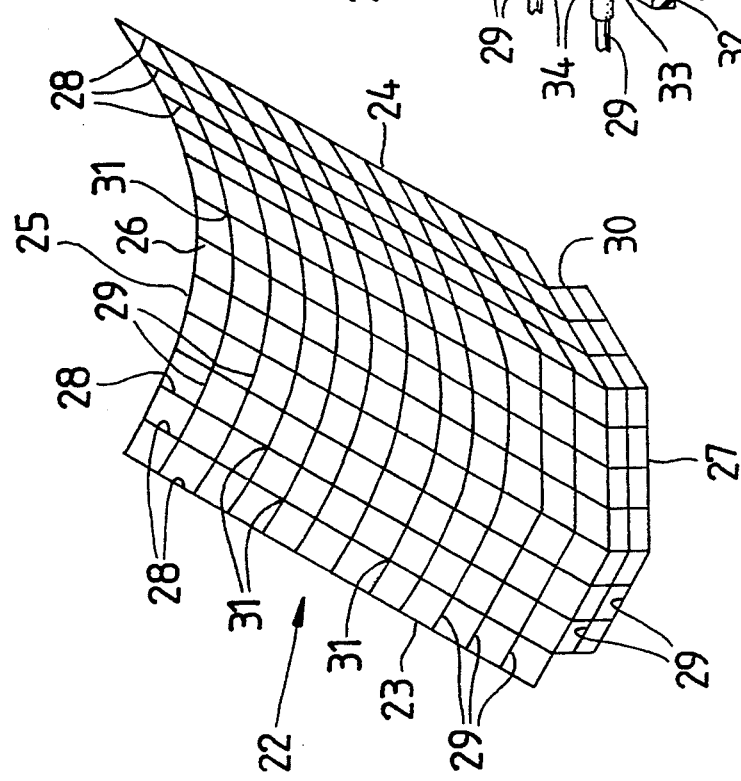
FIG. 5 is a detailed perspective view of the wire members and cross wire members which form the pad shown in FIG. 3.

Referring now to FIG. 5, an egg 20 is supported by the pliable material 32 of ridge 33. The nesting pads 22 are placed within bays 16 of structure 11 to facilitate movement of the egg 20 through opening 19 to chute 17. As may be seen in FIG. 2, a rear edge 25 of nesting pad 22 is elevated and supported by an L-shaped angle member 36 formed on the lower edge of side walls 15. The surface 26 of the nesting pad 22 angles downward toward opening 19 and the front lip 27 of pad 22 rests on a lower angle member 37. Upper surface 26 of the nesting pad 22 is flush with the bottom 19a of opening 19. The chute 17 has a floor support 38 formed from galvanized metal or any suitable material.

In actual operation, an egg 20 is laid by a hen (not shown) within bay 16. The pliant rubber coating 32 allows the egg 20 to be deposited without breakage. Under the influence of gravity the egg 20 moves along ridges 33 down the grade of nesting pad 22 to opening 19. The semi-rigid flap 21 slows the movement of egg 20 allowing the egg 20 to come to rest upon floor support 38 of chute 17 for subsequent collection. The nesting pad 22 can be cleaned on site with a sprayer and does not collect waste or provide a habitat for organisms which are harmful to poultry. The nesting pads 22 are also very durable and as such will not require frequent replacement which increases the producer's expenses.

While I have shown my invention in one embodiment, it will be obvious to those skilled in the art that is not so limited but is susceptible of various changes and modifications without departing from the spirit thereof.

What I claim is:

1. An improved nesting pad for use in a nesting house, said improved nesting pad comprising wire mesh defining a concave upper surface covered with pliable material, said wire mesh further comprising a plurality of spaced-apart, longitudinal wires connected by a plurality of spaced-apart, horizontal cross wires, wherein said pliable material forms longitudinal ridges along an upper surface of each of said longitudinal wires.

2. An improved nesting pad wherein wire mesh is shaped to form a rectangular pad, defining a concave surface on an upper surface thereof, with a first edge of said rectangular pad bent downward from said upper surface to form a lip depending from said upper surface, said wire mesh further comprising a plurality of longitudinal wires connected by a plurality of horizontal cross wires, said plurality of longitudinal wires and said plurality of horizontal cross wires having molded thereon pliable material, said pliable material forming longitudinal ridges on an upper surface of each of said longitudinal wires.

3. An improved nesting pad wherein wire mesh is shaped to form a rectangular pad, said rectangular pad is bent to form a concave surface on an upper surface thereof, a first edge of said rectangular pad is bent downward from said upper surface to form a lip depending from said upper surface, said wire mesh further comprising a plurality of longitudinal wires connected by a plurality of horizontal cross wires, said plurality of longitudinal wires and said plurality of horizontal cross wires having thereon a coating of pliable material such that longitudinal ridges of said pliable material are formed upon the upper surface of each of said longitudinal wires and a sheath of said pliable material forms about each of said horizontal cross wires.

4. An improved nesting pad as defined in claim 3 wherein said pliable material is a rubber composition.

5. An improved nesting pad as defined in claim 3 wherein said pliable material is soft plastic.

* * * * *